E. R. OLIN.
Refrigerator.
No. 198,466. Patented Dec. 25, 1877.
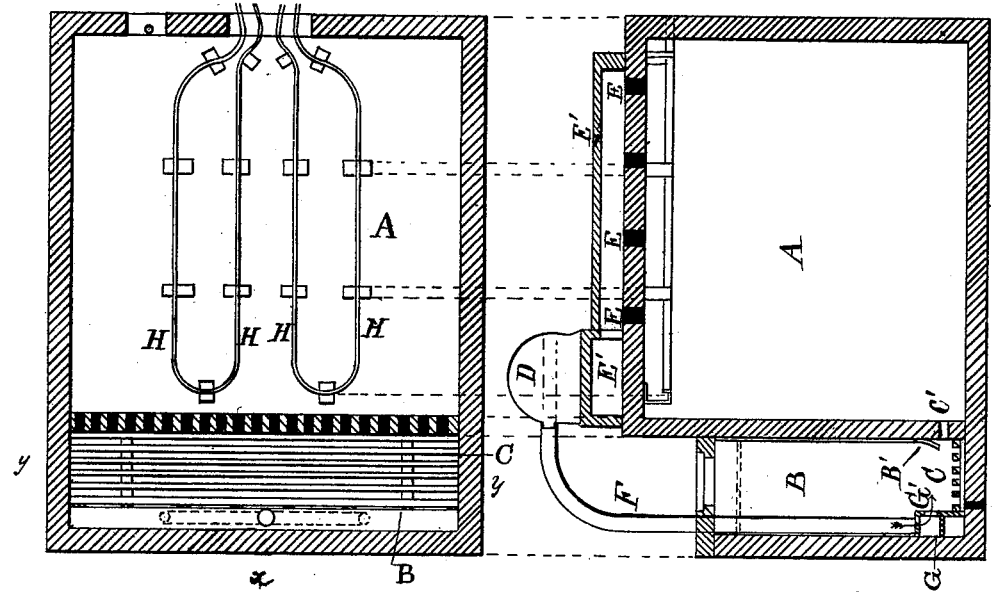
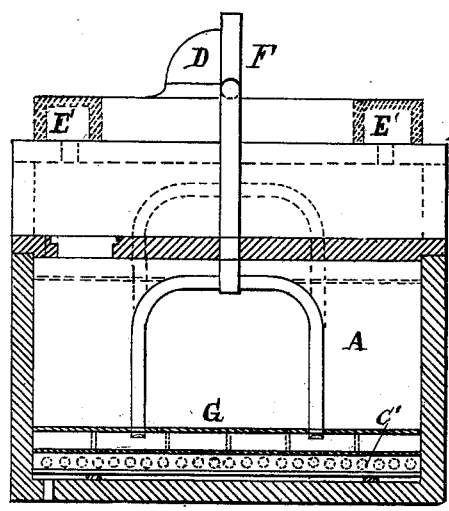
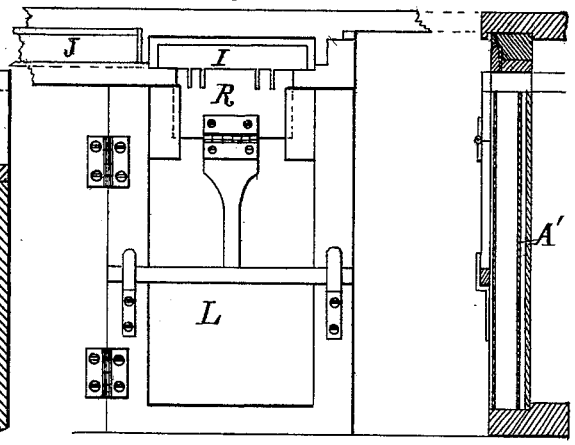
Witnesses
C. M. Connell
W. R. Singleton
Inventor
Edwin R. Olin
Per Blanchard & Singleton
Attys

UNITED STATES PATENT OFFICE.

EDWIN R. OLIN, OF NEW YORK, N. Y.

IMPROVEMENT IN REFRIGERATORS.

Specification forming part of Letters Patent No. 198,466, dated December 25, 1877; application filed July 6, 1877.

*To all whom it may concern:*

Be it known that I, EDWIN R. OLIN, of New York, in the county of New York and State of New York, have invented certain new and useful Improvements in Refrigerators; and I do hereby declare that the following is a full, clear, and exact description thereof, which will enable others skilled in the art to which it appertains to make and use the same, reference being had to the accompanying drawings, and to letters of reference marked thereon, which form a part of this specification—

Figure 1 being a horizontal section, showing the ice-box, the grate upon which the ice rests, the branch pipe for the introduction of air, and the tracks or ways upon which the carcasses of animals or other substances are suspended while being passed into the refrigerator, they being shown as they appear when the cover is placed in position. Fig. 2 is a vertical section on line *x x* of Fig. 1, (turned sidewise for convenience,) showing the preserving-chamber, the ice-box, the air-trunk upon the top of the structure, the fan-blower, and the pipe for conducting the air to the ice-box. Fig. 3 is a transverse section on line *y y* of Figs. 1 and 2, showing the fan-blower, the air-ducts upon the top, the pipe for conducting the air to the ice-box and the distributing-duct near the bottom thereof; and Fig. 4 is a front view, showing the door for admitting the substances to be preserved, and the means for closing the same against the admission of air when the refrigerator is in use.

Corresponding letters denote like parts in all of the figures.

This invention relates to that class of refrigerators in which a forced and continuous circulation of the air contained therein is induced by means of a fan-blower or other air-forcing apparatus, and without admitting a supply from the outside; and it consists in the combination and arrangement of some of the parts of which it is composed, as will be more fully explained hereinafter.

In refrigerators designed, as this is, for preserving large quantities of meats and other substances upon land, in structures erected for that purpose, upon steamships and other vessels at sea, and in railroad-cars while in transit from the interior to the sea-board, it is important that provision should be made for the proper distribution of the air in the ice-box, in order that the melting away of the ice may be alike in all parts of its box, so that as it settles down toward the bottom thereof no holes or apertures will be left through which currents of air can pass without being properly cooled.

Another and a very important advantage arising from this arrangement of parts is, that less resistance is offered to the air in passing through the ice-chamber than is done with those of the usual construction, as in this case the air travels nearly in a straight line across the body of the ice, and consequently it can be caused to circulate from one chamber to the other with greater rapidity and with a less expenditure of power, which has the effect to prevent it from having its temperature raised in the preserving-chamber to such an extent as to result in damaging whatever may be placed therein for preservation.

It is also important that provision should be made for the speedy insertion and removal of the substances to be preserved therein, and that proper provision be made for the exclusion of the air from the outside of the structure while it is in use; and it is the object of this invention to provide suitable means for the accomplishment of these desirable results.

In constructing devices of this character I provide a box or receptacle, A, the walls of which may be provided with spaces, which may be filled with paper or other non-conducting material, it being preferred that the spaces be so small as to be filled with sheets of paper, as shown at A', Fig. 4.

Adjacent to the preserving-chamber A there is placed an ice-box, B, which may be of less height than the preserving-chamber, it being lined upon its interior with sheet metal, and having its walls constructed similar to those of the preserving-chamber A. The bottom of the ice-box is furnished with a grating, C, upon which the ice rests. Immediately above this grating there is a series of apertures, C', formed in the partition between said ice-box and the preserving-chamber, through which the cooled air passes in performing its circuit from one compartment of the device to the other.

In order that the ice may be prevented from obstructing the passage of the air, as above described, the sheet of metal, which is placed upon that portion of the ice-box next to the preserving-chamber, has its lower edge bent inward, as shown at B', Fig. 2, and there is placed behind it a strip of wood or metal, to prevent its being forced out of position by the ice.

In making provision for the continuous circulation of the contained air within and through the preserving-chamber and the ice-box, I place a fan-blower or other suitable air-forcing device in some convenient location, either in, upon, or adjacent to the preserving-chamber, but, by preference, upon the top thereof, as shown at D, Figs. 2 and 3.

This forcing device, when consisting of a fan-blower, is to be provided with a shaft having a pulley thereon, so that it may be driven by any suitable motor, the sides of the fan to be closed up, so that no air can enter it at those points.

When the fan D is put in motion the air contained in the preserving-chamber A is drawn out through a series of apertures, E E E, into the air-duct E', from which it passes to the fan, and is forced therefrom through a pipe, F, branched, as shown in Fig. 3, to a duct, G, placed near the bottom of the ice-box, from which it passes into direct contact with the ice through a series of apertures, G', as shown in Fig. 2.

This arrangement of the parts of the device causes the air, in passing through the ice, to come in contact with all that portion thereof which is in the lower portion of the box, which has the effect to thoroughly cool the same before it re-enters the preserving-chamber, and causes the ice to melt evenly, and consequently to settle down in its box in such a manner as to prevent the formation of apertures or passages through which large currents of air can pass without being properly cooled.

Another method of causing the air to pass through the body of ice is shown in dotted lines in Fig. 3, where the branches of the pipe F are higher up and outside of the structure, and the air-duct G is placed upon the under side of the cover of the ice-box, in which case the air will be forced directly down upon the ice, and will find its way into the preserving-chamber through the apertures G', as in the other method.

Of the two methods described, the former is preferred, as being less likely to form passages or holes in the ice for the passage of the air without its being properly cooled.

Having thus described the devices used for causing the continuous circulation of the air within the structure and for cooling the same in its circuit, I now proceed to show how the carcasses of animals can be readily placed therein, and how the aperture through which they are passed can be sealed against the admission of the warm air without the structure.

In Fig. 1 there are shown two double-rail tracks, H H, which consist of bars of metal set upon their edges, and secured to the roof or top of the structure, their ends being allowed to project out through the wall thereof, from which point they are allowed to extend to the place where the animals are slaughtered, or to the point where they are received, and from which they are to be carried to the refrigerator, the transportation being effected by means of a suitable truck made to run upon the rails H, and from which they are taken and hung upon hooks secured to the roof or cover of the structure. It will be apparent that as the ends of the tracks H H extend through the wall of the preserving-chamber, provision must be made for preventing air from passing in around them. To accomplish this there is placed above them a block or small door, I, which is made to fill the space between their upper edges and the lower surface of the cover of the refrigerator, its inner or bearing surfaces being lined with paper or cloth, so as to make a tight joint; and in order that this opening may be still further protected against the admission of air, a sliding door, J, is provided, which covers the door I, as shown in Fig. 4. For preventing the admission of air around the sides of the bars H, a vertically-moving door, R, with slots in its upper edge, is provided, it being made to move in guides attached to the main door L, so that when the latter is closed the door R may be slid up into closed position, and thus form a tight joint between it and the bars H.

I am aware of the existence of a patent granted to J. H. Wickes, dated December 21, 1875, and numbered 171,456, which has an ice-chamber with laterally-arranged apertures for the passage of air therefrom, and a pipe or pipes and a fan located within the preserving-chamber, for causing the air to be taken from said chamber and returned to the ice-chamber, which is located centrally within said preserving-chamber, and hence I do not claim the arrangement of parts there shown and described.

I am also aware of the existence of a patent granted to R. Burrows, dated May 8, 1877, No. 190,416, which has an ice-chamber located at one end of the preserving-chamber, in which there is located a transverse air-passage, from which the air passes through wire-gauze or finely-perforated metal, and then up over the top of said passage, and thence out into the preserving-chamber; but the arrangement of parts there shown differs essentially from mine, and hence I do not claim what is shown in his case.

I am also aware that there are various other methods of causing a circulation of air from the ice-chamber of a refrigerating structure to the preserving-chamber, all of which differ from that claimed by me, and hence I do not claim any of the combinations or arrangements of devices for that purpose shown in them; but,

Having thus described my invention, what I claim and desire to secure by Letters Patent is—

1. In a refrigerating structure, the combination of a fan-blower, or other suitable air-forcing device for creating a continuous forced circulation of air within the structure, a conduit, E', for conducting the air from the preserving-chamber to an ice-box located outside of said chamber, said conduit being arranged upon the top of the preserving-chamber, and communicating therewith by means of apertures E E E, a branched pipe, F, for directing the air to the ice-box, and a horizontal perforated conduit extending across said box, when said conduit is arranged in the lower portion of the ice-chamber, and the apertures therein are in or nearly in a line with and opposite to those through which the air passes from the ice-box, whereby the currents of air are directed across and through the ice, substantially as and for the purpose specified.

2. The combination of the blower D, the branched pipe F, and the perforated conduit G, substantially as shown and described.

3. The combination of the block or door I, the horizontally-moving slide or door J, and the vertically-moving slotted door R, substantially as and for the purpose set forth.

In testimony that I claim the foregoing as my own I affix my signature in presence of two witnesses.

EDWIN R. OLIN.

Witnesses:
H. W. MENDENHALL,
C. M. CONNELL.